United States Patent [19]

Davidson et al.

[11] 3,848,459

[45] Nov. 19, 1974

[54] PRESSURE TESTING DEVICE FOR GLASS AEROSOL BOTTLES

[75] Inventors: Bruce R. Davidson, Lake Grove; Agustus R. Agneta, Massapequa, both of N.Y.

[73] Assignee: Parfums Rochas, Inc., New York, N.Y.

[22] Filed: Apr. 5, 1973

[21] Appl. No.: 348,318

[52] U.S. Cl. .................................. 73/41.2, 198/230
[51] Int. Cl. ............................................ G01m 3/10
[58] Field of Search ............ 73/41.2, 41, 41.3, 41.4, 73/45.5, 45.4, 52; 198/230, 229, 22 R, 22 B, 16 R, 18; 209/114

[56] References Cited
UNITED STATES PATENTS

| 1,402,251 | 1/1922 | Raymond, Jr. ............... 198/230 X |
| 1,446,161 | 2/1923 | Cushman et al. ................. 73/41.2 |
| 2,398,328 | 4/1946 | Rogers ............................. 73/41.2 |
| 2,714,257 | 8/1955 | Reading ...................... 198/230 X |
| 3,350,919 | 11/1967 | Mucci et al. ..................... 73/41.2 |
| 3,550,432 | 12/1970 | Gundal et al. .................... 73/41.2 |

FOREIGN PATENTS OR APPLICATIONS

| 996,830 | 6/1965 | Great Britain ...................... 73/41.2 |
| 1,203,665 | 9/1970 | Great Britain ......................... 73/52 |
| 448,715 | 4/1968 | Switzerland ...................... 198/22 R |

*Primary Examiner*—Richard C. Queisser
*Assistant Examiner*—Joseph W. Roskos

[57] ABSTRACT

Aerosol containers containing fluids under pressure are transported on a moving link belt conveyor through a heated liquid bath to pressure test the containers and valves. At spaced positions along the moving belt are a plurality of metallic fingers disposed laterally across the belt and the bottles are laid along adjacent rows of fingers. At the discharge end of the belt the aforesaid fingers move downwardly between correspondingly dimensioned recesses in a stationary discharge plate and the bottles roll down the discharge plate onto the receiving platform or table.

4 Claims, 2 Drawing Figures

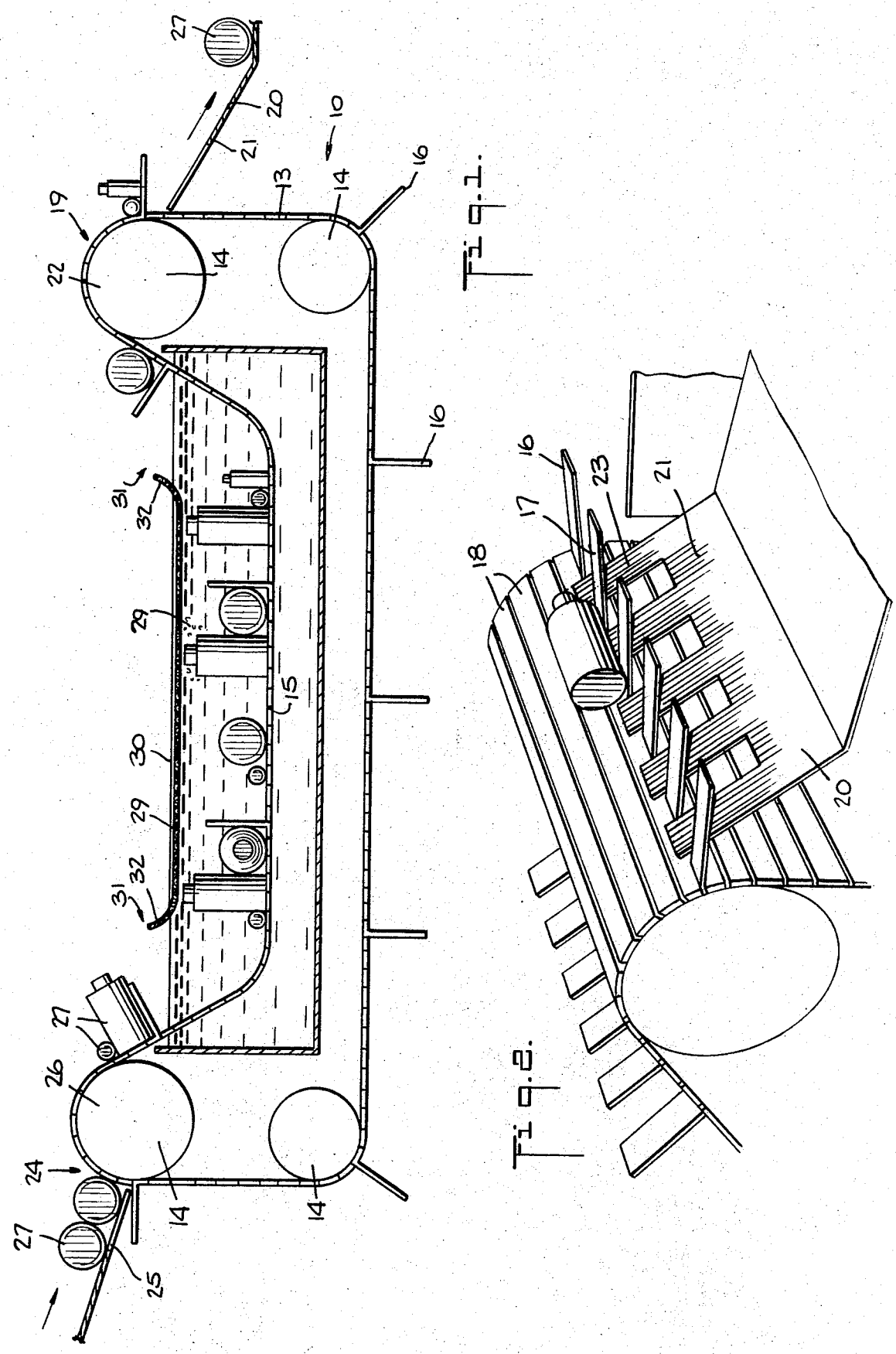

PRESSURE TESTING DEVICE FOR GLASS AEROSOL BOTTLES

BACKGROUND OF THE INVENTION

In the packaging of pressurized fluids in aerosol containers it is necessary to pressure test each container for leakage and container strength to prevent loss of the fluid contents during handling and transportation of the containers to the point of scale, as well as after sale by the ultimate purchaser and user.

Since the majority of aerosol containers are metallic cans the pressure testing methods employed for such containers has involved the use of magnetic devices to hold the cans on the conveyor belt which is used to transport the cans in a submerged condition through the heated bath. However, in the case of non-ferrous (e.g., glass) containers the use of magnets have not been possible and prior techniques with such containers have required hand operations which are time consuming and therefore relatively costly.

BRIEF SUMMARY OF THE INVENTION

The present invention provides apparatus for pressure testing aerosol containers which is capable of pressure testing a plurality of differently dimensioned containers at the same time and further provides means for automatically discharging the containers from the apparatus after pressure testing. The apparatus involves an endless conveyor belt associated with a heated pressure testing liquid bath, the belt having a plurality of transversely disposed comb like devices at spaced positions adapted to receive between adjacent combs one or more aerosol containers in any orientation thereof. The belt transports the containers in a submerged condition through the bath and then at a point beyond the bath the combs pass at a downnwardly inclined angle through a complementary stationary comb discharge plate whereupon the containers are removed from the conveyor belt by gravity and delivered down the discharge plate to a receiving station.

DESCRIPTION OF THE DRAWINGS

FIG. 1 in an overall side elevation view of the pressure testing apparatus in section; and FIG. 2 is an enlarged isometric view of the discharge end of the apparatus.

DESCRIPTION OF THE PREFERRED EMBODIMENT

Referring now to the drawings the pressure testing apparatus of the present invention is designated generally by reference numeral 10. It includes an elongated tank 11 containing liquid 12 such as water or the like which is heated to an elevated temperature by any conventional means (not shown) in accordance with conventional aerosol pressure testing practices. Endless conveyor belt 13 is trained around pulley or drum members 14 as shown to convey a submerged portion 15 of the belt 13 through the tank as shown. At least one of the pulleys or drums 14 is interconnected by suitable means with driving means (not shown) in a conventional manner.

At spaced positions along the conveyor belt are disposed a plurality of comb members 16 which have main body portions extending generally perpendicular to the surface of the belt 13. Each comb member 16 is comprised of a plurality of spaced finger members 17 (see FIG. 2). The conveyor belt may be constituted by a plurality of link members 18 of any suitable material, metallic or synthetic plastic or rubber, or may be of any other convenient conventional construction as desired. At the discharge end 19 of the apparatus is disposed a stationary discharge plate 20 which is anchored to a discharge table or the like (not shown) and has an inclined ramp portion 21 extending upwardly at an angle, terminating at its upper end adjacent the path of belt 13 in the vicinity of pulley 22. The discharge ramp 21 has a plurality of complementary finger members 23 disposed to intermesh with the fingers 17 of comb members 16 on the belt as shown in FIG. 2.

At the entrance or feed end 24 of the apparatus is a similar feed ramp 25 inclined downwardly toward belt 13 adjacent pulley 26 and disposed with a plurality of complementary fingers to intermesh with the fingers 17 of comb members 16 as shown in FIG. 1.

Container members 27 of random sizes are fed along feed ramp 25 and are picked up by comb member 16 adjacent drum 26 and are fed as shown through the pressure testing bath and then out of the bath and dumped at drum 22 onto inclined ramp 21 of the discharge plate. During passage through the bath a visual check is made for bubbles 28 to indicate a leaking container which can be removed by hand at the discharge end of the apparatus.

In order to permit the testing apparatus to handle filled containers with a specific gravity less than that of the fluid medium 12 a foraminous member such as the screen 29 may be included and disposed over the submerged portion of conveyor belt 13 and beneath the surface 30 of the liquid 12 to maintain such buoyant containers in a submerged condition during passage through the liquid 12. The screen 29 terminates at its respective ends 31 in flared or upturned portions 32 so that the containers entering the bath will be smoothly assimilated by the screen without jamming.

By the present arrangement aerosol containers can be pressure tested in an automatic fashion where the feeding in and discharge of the containers can be handled automatically without necessitating manual operation except for the removal of the leaking containers. One of the additional advantages is that containers of various sizes can be pressure tested simultaneously.

While one embodiment of the invention has been shown and described it is to be understood that certain changes and additions can be made by those skilled in the art without departing from the scope and spirit of the invention.

We claim:

1. In an aerosol pressure testing apparatus for testing aerosol containers of random sizes and orientations containing fluid under pressure including a heated liquid bath through which an endless belt conveys the containers to be pressure tested, said belt being trained around rollers disposed around a tank holding said bath and respective rollers being disposed at elevated positions adjacent each end of the tank, the improvement comprising a plurality of transverse holding members carried by said belt for retaining said containers on said belt during passage thereof through said bath, and for receiving said containers on and discharging the same from said belt by gravity, said members each including a plurality of spaced fingers extending outwardly from the surface of said belt, a downwardly inclined feed ramp at the input end of said apparatus and a downwardly inclined discharge ramp at the discharge end of said apparatus, each said ramp being stationary and including complementary fingers adapted to intermesh with the fingers on said belt to feed onto and discharge from said belt respectively, said containers by gravity.

2. In the apparatus of claim 1, said holding members being upright and said fingers on said ramp having their outer ends disposed adjacent said elevated rollers.

3. In the apparatus of claim 2, the spacing between adjacent fingers of each holding member being substantially less than the smallest dimension of the smallest container to be tested.

4. The apparatus of claim 3 including a longitudinally extending screen retaining member disposed above said belt and adapted to retain said containers in a submerged condition during passage through said bath.

* * * * *